Patented Apr. 20, 1926.

1,581,447

UNITED STATES PATENT OFFICE.

WILLIAM HOXIE, OF SHELLMAN, GEORGIA, ASSIGNOR TO HENRY S. GEERY, OF STAMFORD, CONNECTICUT.

FLUX.

No Drawing.  Application filed March 19, 1925. Serial No. 16,605.

*To all whom it may concern:*

Be it known that I, WILLIAM HOXIE, a citizen of the United States, residing in Shellman, in the county of Randolph, in the State of Georgia, have invented certain new and useful Improvements in Flux, of which the following is a specification.

This invention relates to a composition of matter in the nature of a flux or welding compound. The object of the invention is to provide a composition of matter which shall have wide application to various metals as a flux for welding or brazing purposes. The invention also seeks to provide a composition or flux which shall be capable of effective use upon oily or greasy metallic surfaces without the necessity of cleaning them. In some aspects, the invention relates to improvements in the flux disclosed in a co-pending application by the present applicant Serial No. 715,922 filed May 26, 1924.

One of the chief objections to welds of ferrous metals effected with the aid of many fluxes is that the surface of the metal is so hard as to be practically impossible of machining. A further object of the invention is to provide a flux which shall have a softening effect on a weld of ferrous metals in order that the welded surface may be machined. To this end what may be termed a softening agent is combined with other elements of the flux and by the term softening agent is meant one which when so combined will have the desired effect.

In carrying out the invention a compound is formed composed of borax, ferric oxide, a softening agent, bicarbonate of soda and sal ammoniac. In the preferred embodiment of the invention the softening agent is an ingredient having an alkaline reaction and is generally calcium sulphate. A major proportion of borax may be incorporated in the flux together with minor proportions of ferric oxide, an alkali, bicarbonate of soda and sal ammoniac, and these ingredients are pulverized and thoroughly mixed in a dry state so as to form a fairly even mixture. It has been found that best results have been obtained with the use of calcined borax and with calcium sulphate as the ingredient having an alkaline reaction or softening agent although other softening agents have been found effective.

A typical composition which is known to give the desired results is calcined borax 80%, ferric oxide 2%, calcium sulphate 8% bicarbonate of soda 5% and sal ammoniac 5%.

Other ingredients having alkaline reactions may be substituted for the calcium sulphate with generally satisfactory results, for instance, sodium hydroxide or potassium hydroxide may be used. It has also been found that a mixture of the two last named substances, may in some circumstances, be found to give satisfactory results when substituted in the flux for the softener.

While commercial borax may be used in the flux, it is preferred that the borax be calcined inasmuch as ordinary borax bubbles up and hides the weld from the operator whereas frothing is prevented by the use of calcined borax.

In use, the metallic surfaces to be welded or brazed are covered with a compound in the manner usual with other welding compounds or fluxes.

The compound has a wide application and can be used with substantially all metals. It is found that it will not only aid in welding and brazing, but will refine and toughen the metals at the welded surfaces and will permit a perfect junction of the welded surfaces to be obtained. It has also been found to permit perfect welding or brazing with dirty, oily or greasy surfaces thereby obviating the necessity of cleaning such surfaces before they can be effectively worked on.

While it cannot be said with certainty what effect the ingredients have upon each other or what effect each contributes to the results obtained by the mixture as a whole, nevertheless it has been ascertained that the mixture of the ingredients hereinbefore set forth in the proportions indicated gives a welding compound which is superior in every respect to borax when used alone or to any other known combination of ingredients heretofore used in this capacity. Furthermore any deleterious effects, such as hardening of the weld or lack of homogeneity in the welded joint which in certain circumstances may be found to result with the use of borax alone are overcome with the present compound. Difficulty has heretofore been presented in the use of many fluxes hitherto placed upon the market in that the weld in which they are used is not homogeneous. With the use of a flux according to the present invention the weld is found to be homogeneous in that the welding compound is such that it causes the metal added to the weld to flow or combine with the base metal.

It is understood that the percentages of the various ingredients hereinbefore recited as going to form the flux according to the present invention are given as examples only and that variations from the exact proportions within prescribed limits are to be deemed within the spirit and scope of the invention, no limitation being intended except as indicated in the appended claims.

What I claim is:

1. A flux consisting of a major proportion of borax and minor proportions of oxide of iron, a carbonate of soda, sal ammoniac, calcium sulphate and a softening agent.

2. A flux comprising borax, oxide of iron, a carbonate of soda, sal ammoniac, and a softening agent.

3. A flux comprising borax, oxide of iron, a carbonate of soda, sal ammoniac, and an ingredient having an alkaline reaction.

4. A flux comprising borax, oxide of iron, a carbonate of soda, sal ammoniac, and a plurality of ingredients having an alkaline reaction.

5. A flux comprising borax, oxide of iron, a carbonate of soda, sal ammoniac, and calcium sulphate.

6. A flux consisting of a major proportion of borax, and minor proportions of oxide of iron, bicarbonate of soda, sal ammoniac, and a softening agent.

7. A flux consisting of a major proportion of borax, and minor proportions of oxide of iron, bicarbonate of soda, sal ammoniac, and an ingredient having an alkaline reaction.

8. A flux consisting of a major proportion of borax, and minor proportions of oxide of iron, bicarbonate of soda, sal ammoniac and a plurality of ingredients having an alkaline reaction.

9. A flux consisting of a major proportion of borax, and minor proportions of oxide of iron, bicarbonate of soda, sal ammoniac, and calicum sulphate.

10. A flux consisting of eighty percent borax, two percent ferric oxide, five percent bicarbonate of soda, five percent sal ammoniac and eight percent of a softening agent.

11. A flux consisting of eighty percent borax, two percent ferric oxide, five percent bicarbonate of soda, five percent sal ammoniac, and eight percent of an ingredient having an alkaline reaction.

12. A flux consisting of eighty percent borax, two percent ferric oxide, five percent bicarbonate of soda, five percent sal ammoniac, and eight percent of a plurality of ingredients having an alkaline reaction.

13. A flux consisting of eighty percent borax, two percent ferric oxide, five percent bicarbonate of soda, five percent sal ammoniac, and eight percent of calcium sulphate.

14. As a composition of matter, a welding and brazing compound consisting of the following ingredients pulverized and intimately mixed in the following proportions: borax, eighty percent; ferric oxide, two percent; calcium sulphate, eight percent; bicarbonate of soda, five percent; and sal ammoniac five percent.

15. A flux comprising borax, oxide of iron, a carbonate of sodium, sal ammoniac, calcium sulphate and a softening agent.

16. A flux consisting of 80% borax, 2% ferric oxide, 5% bicarbonate of soda, 5% sal ammoniac, 8% calcium sulphate and a softening agent.

This specification signed this 30 day of Dec., A. D. 1924.

WILLIAM HOXIE.